United States Patent
Minezawa et al.

[11] Patent Number: 5,251,680
[45] Date of Patent: Oct. 12, 1993

[54] COLLISON-PREVENTING APPARATUS FOR ELECTRIC MOTOR VEHICLE

[75] Inventors: Yukihiro Minezawa; Mutsumi Kawamoto, both of Tokyo; Hidemitsu Inagaki, Nishio, all of Japan

[73] Assignee: Aisin AW Co., Ltd., Japan

[21] Appl. No.: 741,949

[22] Filed: Aug. 8, 1991

[30] Foreign Application Priority Data

Aug. 8, 1990 [JP] Japan .................. 2-209483

[51] Int. Cl.$^5$ ............................. B60K 31/00
[52] U.S. Cl. .................... 180/169; 180/170; 180/65.1; 180/65.8; 364/426.01
[58] Field of Search ............ 180/167, 168, 169, 274, 180/275, 277, 279, 280, 282, 65.1, 65.5, 65.8; 364/424.02, 424.01, 426.01; 318/587; 342/72

[56] References Cited

U.S. PATENT DOCUMENTS

| | | | |
|---|---|---|---|
| 3,621,929 | 11/1971 | Oberthur et al. | 180/65.1 |
| 3,749,197 | 7/1973 | Deutsch | 180/169 |
| 3,898,652 | 8/1975 | Rashid | 180/169 |
| 4,673,937 | 6/1987 | Davis | 342/72 |
| 4,722,410 | 2/1988 | Melocik et al. | 180/169 |
| 4,833,469 | 5/1989 | David | 180/169 |
| 5,004,061 | 4/1991 | Andruet | 180/65.5 |
| 5,064,013 | 11/1991 | Lenz | 180/65.5 |

FOREIGN PATENT DOCUMENTS 63-32388 2/1988 Japan .
64-46111 2/1989 Japan .

Primary Examiner—Richard M. Camby
Attorney, Agent, or Firm—Lorusso & Loud

[57] ABSTRACT

A collision-preventing apparatus for an electric motor vehicle in which wheels are driven by electric motors and the electric motors are subjected to braking such as regenerative braking or dynamic braking. The apparatus includes an obstacle sensor and a control unit for processing detected information supplied from the obstacle sensor and for outputting a brake actuation signal when the result of processing indicates a set of conditions predetermined to be dangerous, so as to apply brakes to the electric motors.

11 Claims, 8 Drawing Sheets

COLLISON-PREVENTING APPARATUS FOR ELECTRIC MOTOR VEHICLE

BACKGROUND OF THE INVENTION

1. Field of the Invention

The present invention relates to an electric motor vehicle in which wheels are driven by an electric motor, and more particularly to a collision-preventing apparatus for an electric motor vehicle which in a case where an obstacle is present in front of the electric motor vehicle, prevents a collision of the electric motor vehicle against the obstacle.

2. Description of the Related Art

In recent years, development has been made in the field of electric motor vehicles using an electric motor as a driving source in view of such needs as improvement of the environment, an extrication from dependence on fossil fuels, and a diversification of energy sources. As such electric motor vehicles, for instance, forklifts, golf carts, and various other vehicles are known.

In braking such an electric motor vehicle, unlike an ordinary vehicle using an internal combustion engine as a driving source, it is possible to apply brakes by means of electric braking. With this electric braking, however, it is impossible to bring the vehicle to a standstill completely or suddenly. Accordingly, frictional braking by means of hydraulic pressure and electric braking are used jointly in many cases.

Meanwhile, when an obstacle is present in front of the vehicle, the driver generally operates a foot brake to decelerate the vehicle or bring the same to a standstill, or steer the vehicle by maneuvering a steering wheel, so as to prevent the vehicle from colliding against the obstacle. However, should the driver fail to notice such an obstacle, or if the obstacle is a vehicle running just in front of it, there are cases where the driver fails to visually measure the relative speed or the following distance with respect to that vehicle. As a result, the vehicle can collide against that obstacle.

To cope with such a problem, apparatus in which the foot brake is actuated by detecting an obstacle by means of a radar apparatus have hitherto been proposed in Japanese Patent Application Laid-Open Nos. 63-32388 and 64-4611. According to the apparatus disclosed in these publications, it is possible to prevent a collision of an automobile against an obstacle.

However, with the apparatus disclosed in Japanese Patent Application Laid-Open No. 63-32388, an actuator capable of producing a large force is required so as to actuate the brakes automatically. For this reason, the apparatus becomes not only large in size but expensive.

In addition, with the apparatus disclosed in Japanese Patent Application Laid-Open No. 64-4611, since the apparatus is used for autonomous running, a control unit for controlling the braking force is bound to become complicated.

SUMMARY OF THE INVENTION

In view of the above-described circumstances, it is an object of the present invention to provide a collision preventing apparatus for an electric motor vehicle capable of simply and positively preventing a collision with an obstacle by controlling an electric motor and of being formed with a compact structure.

To this end, in accordance with the present invention, there is provided a collision-preventing device for an electric motor vehicle in which wheels are driven by an electric motor and the electric motor is subjected to braking, comprising: an obstacle sensor for detecting the presence of an obstacle; and a control unit for processing detected information supplied from the obstacle sensor and outputting a brake actuation signal when a result of the processing corresponds to a predetermined condition, so as to apply a brake to the electric motor.

According to the collision-preventing apparatus for an electric motor vehicle of the present invention, since there are provided an obstacle sensor and a control unit for processing detected information supplied from the obstacle sensor and outputting a brake actuation signal when a result of the processing corresponds to a predetermined condition, so as to apply a brake to the electric motor, the obstacle sensor detects the presence of the obstacle, measures a distance to the obstacle, and transmits the information to the control unit. The control unit performs arithmetic processing on the basis of the information. When the result of calculation corresponds to a predetermined condition, the control unit applies a brake such as regenerative braking to the electric motor, thereby braking the electric motor vehicle. As a result, since the electric motor vehicle is decelerated or brought to a standstill, it is possible to prevent a collision of the electric motor vehicle against the obstacle.

In addition, in that case, since the control unit of the electric motor causes the brake to function as part of motor control, braking control becomes simple, and special component parts such as a large-output actuator and the like for actuating a normally used brake become unnecessary. Hence, the apparatus can be made compact.

Furthermore, if regenerative braking is used as a brake, energy can be recovered and an energy-saving effect can be attained.

The above and other objects, features and advantages of the present invention will become more apparent from the following detailed description of the invention when read in conjunction with the accompanying drawings.

BRIEF DESCRIPTION OF THE DRAWINGS

FIGS. 1A and 1B schematically illustrate an electric motor vehicle to which a collision-preventing apparatus for an electric motor vehicle in accordance with the present invention is applied, in which FIG. 1A is a diagram of the layout of various constituent members, and FIG. 1B is a diagram illustrating the state of electrical connection of motors, motor drivers, electric power units, and a control unit;

FIG. 9A and 9B illustrate maps for determining a braking force based on the relative speed with respect to an obstacle, in which FIG. 9A is a map for a case where the distance to the obstacle is relatively small, and FIG. 9B is a map for a case where the distance to the obstacle is relatively large.

DESCRIPTION OF THE PREFERRED EMBODIMENT

Referring now to the accompanying drawings, a description will be given of an embodiment of the present invention.

Figure 1A:
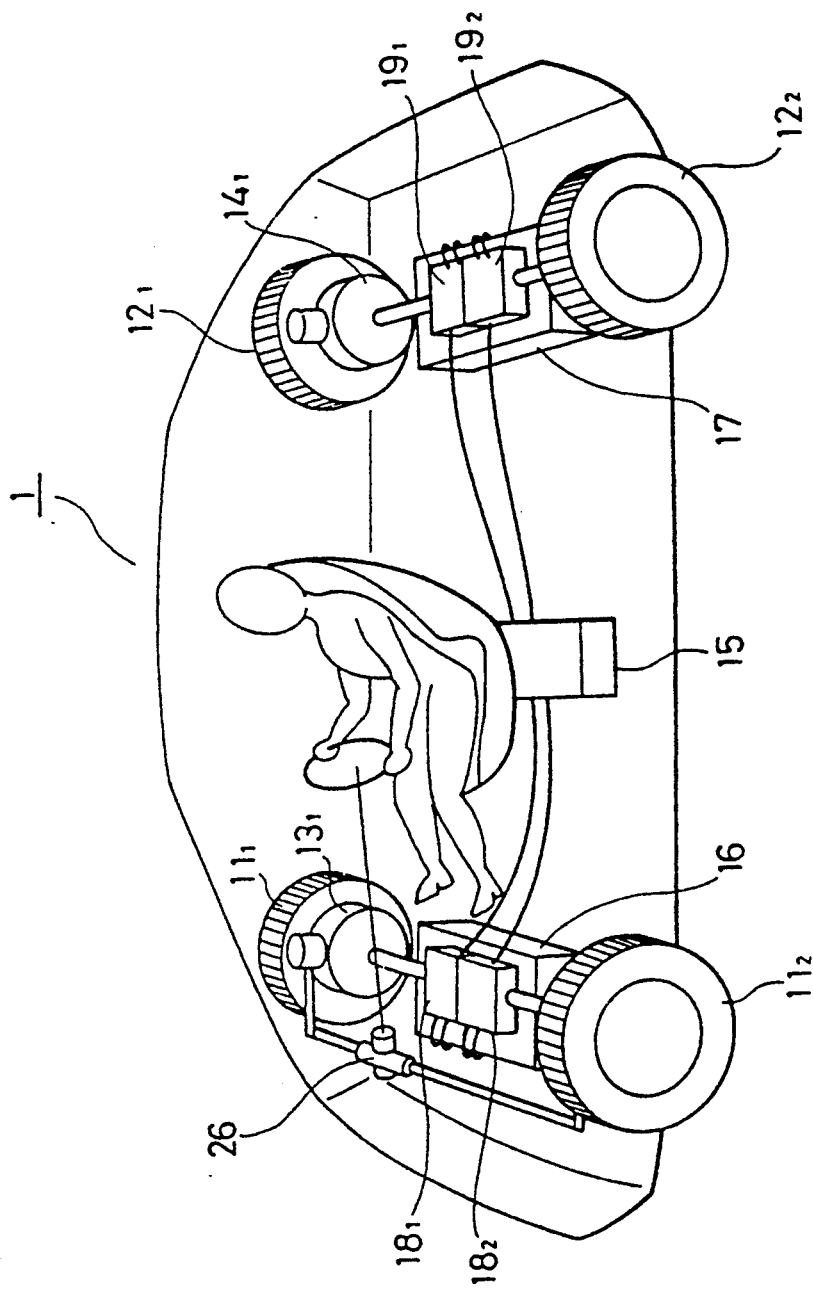
Figure 1B:
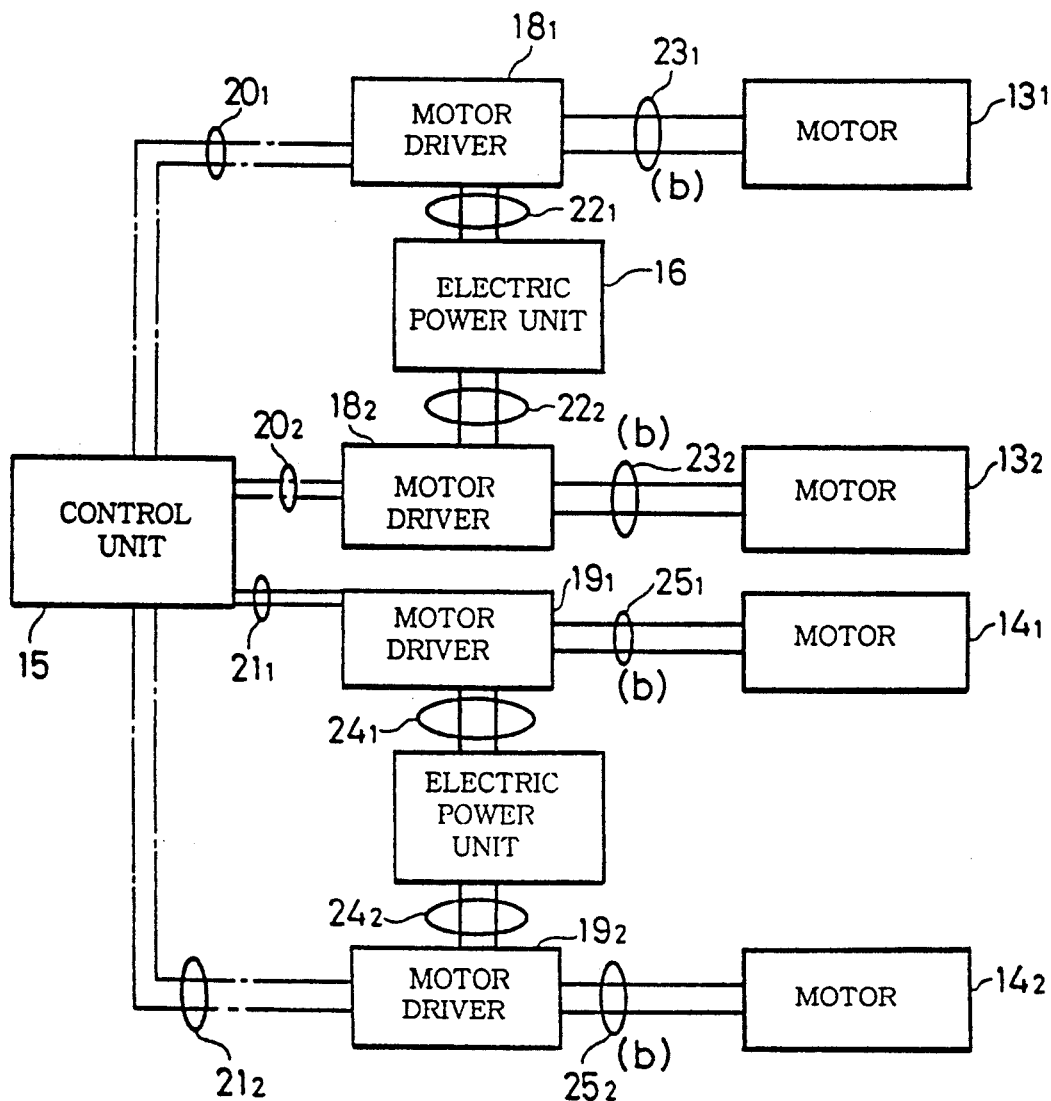

FIGS. 1A and 1B schematically illustrate an example of an electric motor vehicle to which the present invention is applied. Specifically, FIG. 1A is a diagram of the layout of electric power units, a control unit, motor drivers, and motors in the electric motor vehicle in which the motors are disposed for the respective wheels, and FIG. 1B is a circuit diagram illustrating the state of electrical connection of the electric power units, control unit, motor drivers, and motors. In the drawing, reference numeral 26 denotes a manual steering device.

In an electric motor vehicle 1 to which the present invention is applied, four wheels are adapted to be driven directly by four driving motors, respectively, without using a transmission and the like. The motors are respectively driven by motor drivers separately disposed. The motor drivers are adapted to supply electric current to the respective motors in correspondence with the torque acting in the rotating direction, so as to drive the motors. Specifically, a motor $13_1$ is mounted associated with a right front wheel $11_1$, while a motor $13_2$, not shown in FIG. 1A, is mounted associated with a left front wheel $11_2$. A motor $14_1$ dismounted associated with a right rear wheel $12_1$, while a motor $14_2$, not shown in FIG. 1A, is mounted associated with a left rear wheel $12_2$. An electric power unit 16 is disposed substantially in the center of the vicinity of a line connecting the front wheels $11_1$, $11_2$, and a motor driver $18_1$ for driving the motor $13_1$ and a motor driver $18_2$ for driving the motor $13_2$ are mounted on the electric power unit 16. In addition, an electric power unit 17 is disposed substantially in the center of the vicinity of a line connecting the rear wheels $12_1$, $12_2$, and a motor driver $19_1$ for driving the motor $14_1$ and a motor driver $19_2$ for driving the motor $14_2$ are disposed on the electric power unit 17.

A control unit 15 is designed to calculate motor command values to be imparted to the motor drivers $18_1$, $18_2$, $19_1$, $19_2$, and is disposed, for instance, below a driver's seat, as shown in FIG. 1A.

The command values for the respective motors determined by the control unit 15 are transmitted to the motor drivers via respective control signal lines. As shown in FIG. 1B, a driving force for the motor $13_1$ is signalled to the motor driver $18_1$ via a control signal line $20_1$; a driving force for the motor 132 is signalled to the motor driver $18_2$ via a control signal line $20_2$; a driving force for the motor $14_1$ is signalled to the motor driver $19_1$ via a control signal line $21_1$; and a driving force for the motor 142 is signalled to the motor driver $19_2$ via a control signal line $21_2$.

Optical cables are used as the control signal lines $20_1$, $20_2$, $21_1$, $21_2$, and the instruction of the motor command values instructed from the control unit 15 to the respective motor drivers $18_1$, $18_2$, $19_1$, $19_2$ is effected through optical communication.

The electric power source is divided into two parts. One electric power unit 16 is used for driving only the motors $13_1$, $13_2$ for driving the front wheels, so that the unit is connected to the motor drivers $18_1$, $18_2$ via power lines $22_1$, $22_2$, as shown in FIG. 1B. The other electric power unit 17 is used for driving only the motors $14_1$, $14_2$ for driving the rear wheels, so that the unit is connected to the motor drivers $19_1$, $19_2$ via power lines $24_1$, $24_2$. he output of the motor driver $18_1$ is supplied to the motor $13_1$ via a power line $23_1$; the output of the motor driver $18_2$ is supplied to the motor $13_2$ via a power lines $23_2$; the output of the motor driver $19_1$ is supplied to the motor $14_1$ via a power line $25_1$; and the output of the motor driver $19_2$ is supplied to the motor $14_2$ via a power line $25_2$.

In accordance with the above-described configuration, the motor drivers $18_1$, $18_2$, $19_1$, $19_2$ control electric power supplied from the electric power units 16, 17 by switching over the state of energization of switching elements on the basis of motor command values communicated by the control unit 15, so as to supply predetermined power to the motors $13_1$, $13_2$, $14_1$, $14_2$, respectively.

Figure 2:
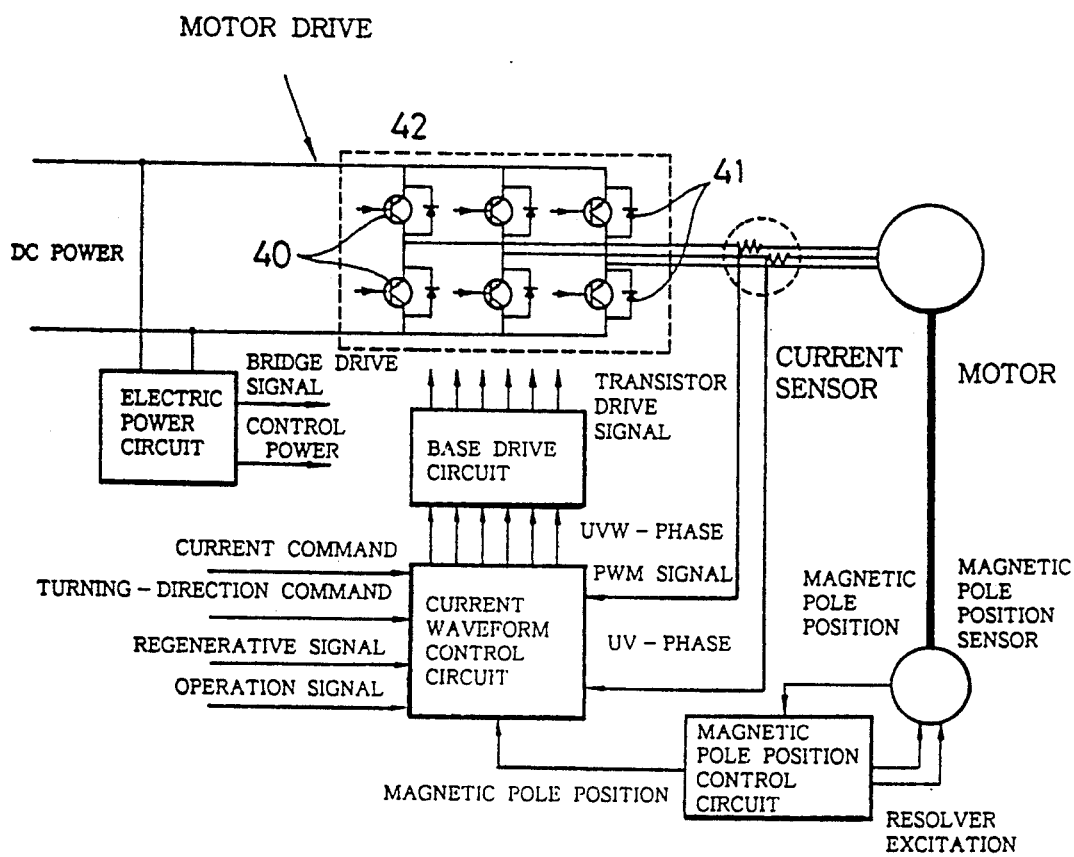
FIG. 2 is a block diagram of a motor control circuit.

FIG. 2 is a block diagram of a control circuit for the respective motors. As shown in FIG. 2, each of the motor drivers $18_1$, $18_2$, $19_1$, $19_2$ for controlling electric current to be supplied to the respective drive motors $13_1$, $13_2$, $14_1$, $14_2$ in this electric motor vehicle has a bridge circuit 42 comprised of transistors 40 and diodes 41 and adapted to control the current to the motor.

A description will now be given of processing which is effected by the control unit 15.

Figure 3:
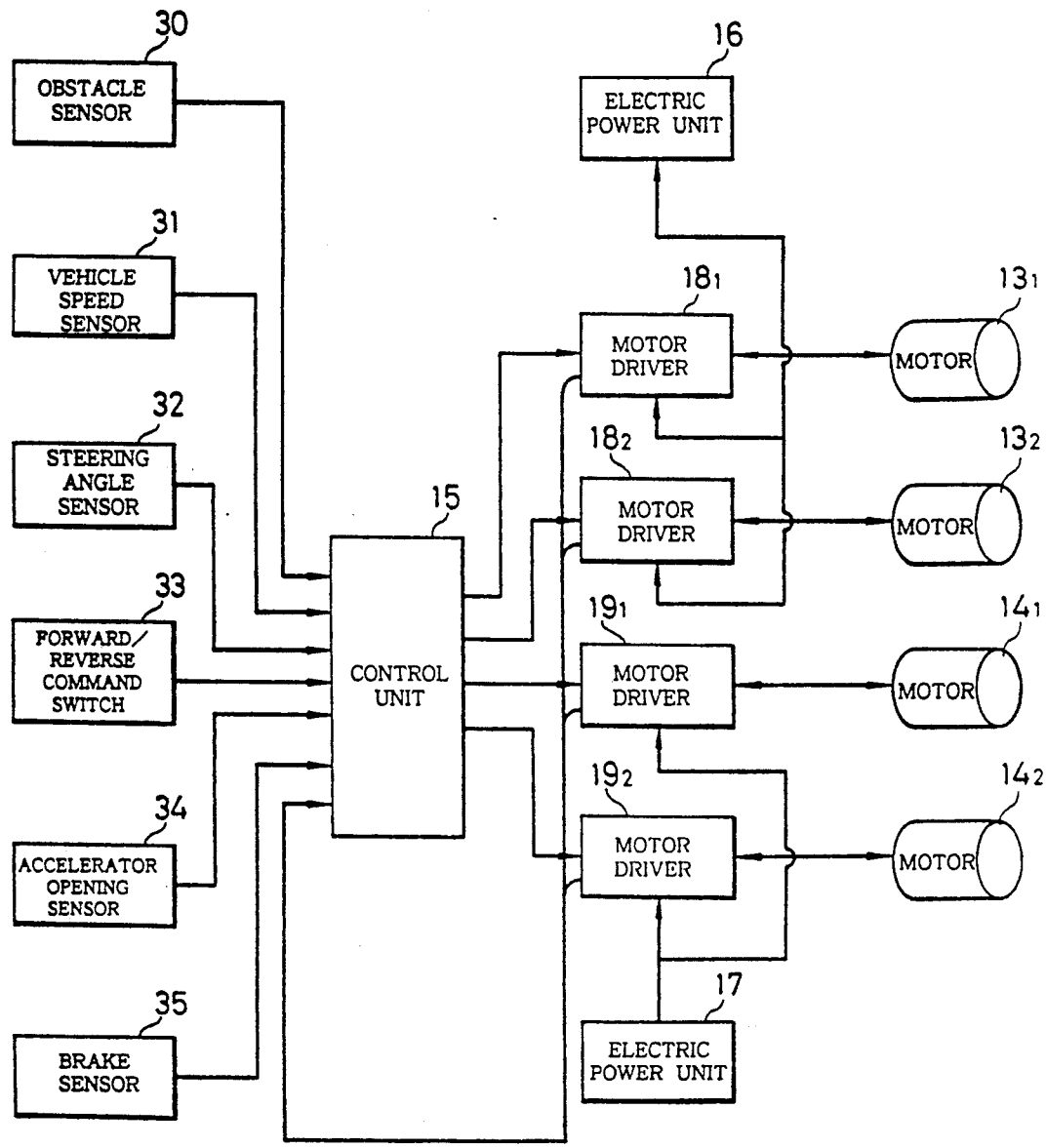
FIG. 3 is a diagram illustrating an electric control system.

FIG. 3 is a diagram of the control system for a electric motor vehicle in accordance with the present invention.

In FIG. 3, the number of revolutions of the motors $13_1$, $13_2$, $14_1$, $14_2$ are respectively outputted from the motor drivers $18_1$, $18_2$, $19_1$, $19_2$ to the control unit 15. It should be noted that the numbers of revolution of the motors $13_1$, $13_2$, $14_1$, $14_2$ are each detected by a signal from an unillustrated resolver.

An obstacle sensor 30 is a known sensor which makes use of electromagnetic waves, such as microwaves or millimeter waves, a laser beam, or the like. The obstacle sensor 30 detects the presence of an obstacle located in front of the vehicle and measures the distance to that obstacle.

A vehicle speed sensor 31 is a sensor for measuring the number of revolutions of the wheels in a vehicle. In addition, a steering angle sensor 32 detects the steering angle of a steering wheel, and a forward/reverse command switch 33 is used by the driver to give a command to advance or reverse the vehicle. Furthermore, an accelerator opening sensor 34 detects the amount of travel of accelerator pedal, while a brake sensor 35 detects the amount of travel of a brake pedal. Outputs of these sensors are accepted by the control unit 15 at predetermined timings, and are then processed by being digitized by an A/D converter (not shown).

Detected signals from these sensors and switches are inputted to the control unit 15, and the control unit 15 executes processing and calculation on the basis of these detected signals and outputs drive control signals to the respective motor drivers on the basis of the results to the processing and calculation.

In the present invention, if an obstacle is present in front of an electric motor vehicle when the vehicle is running, and if there is a likelihood of the vehicle colliding against that obstacle, control is effected in such a manner as to apply electric brakes to the driving motors, thereby preventing the collision of the electric motor vehicle against the obstacle. A description will be given hereinunder of this control.

Figure 4:
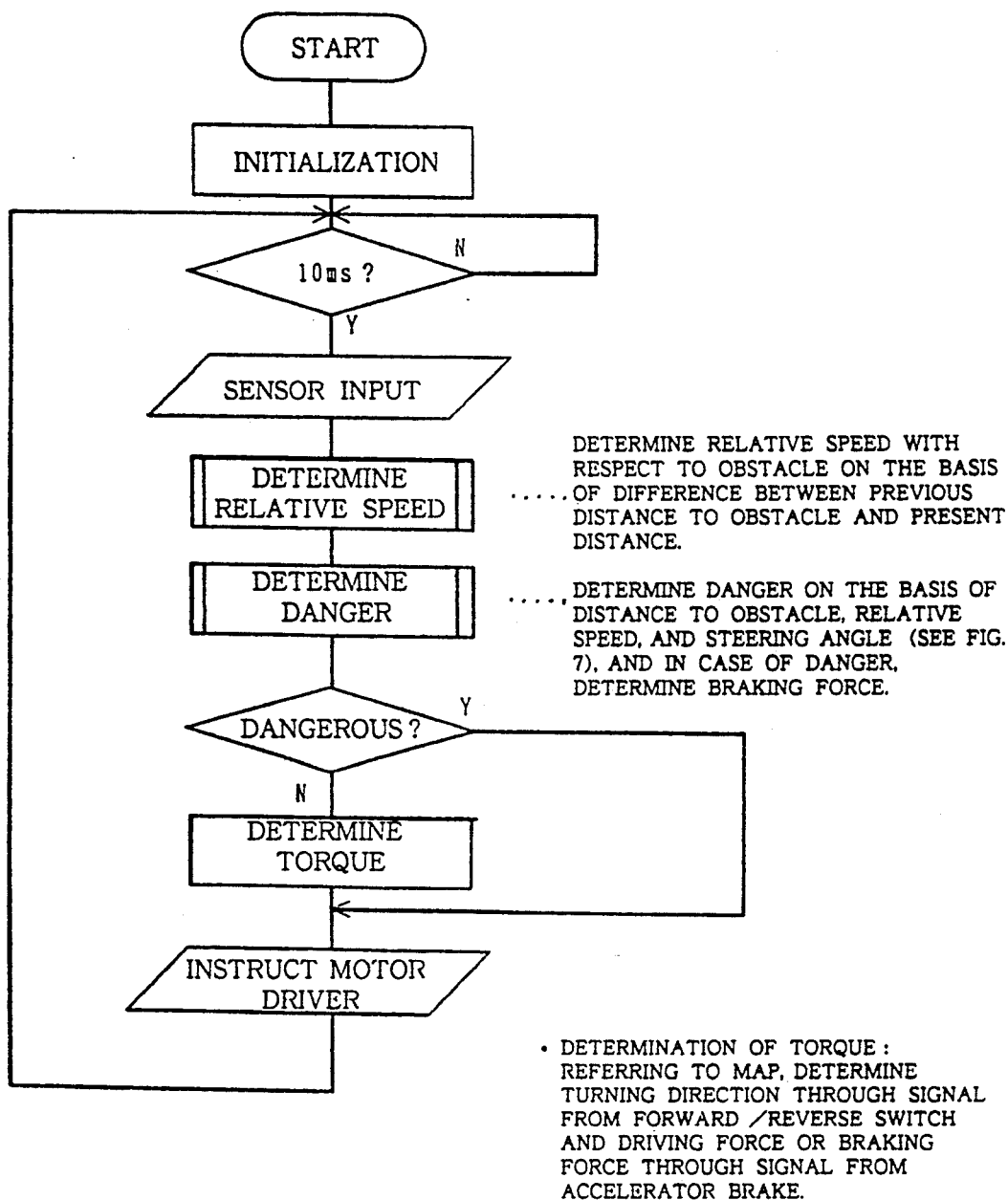
FIG. 4 is a diagram illustrating a control flow for effecting collision-preventing control.

FIG. 4 is a flow diagram illustrating this control.

As shown in FIG. 4. after initialization, setting is provided such that a measurement is effected at intervals of 10 msec, and after the lapse of each 10 msec, detected signals from the respective sensors are inputted to the control unit 15. In that case, when an electric motor vehicle is running, if an obstacle, such as another vehicle running in front, is present, that obstacle is detected by the obstacle sensor 30, and the distance from the vehicle to the obstacle is measured, and a detection signal and a distance signal are inputted to the control unit 15. Additionally, a steering angle signal and a signal representing whether the electric motor vehicle is moving forward or backward are inputted from the steering angle sensor 32 and the forward/reverse command switch 33, respectively, to the control unit 15.

Figure 5:
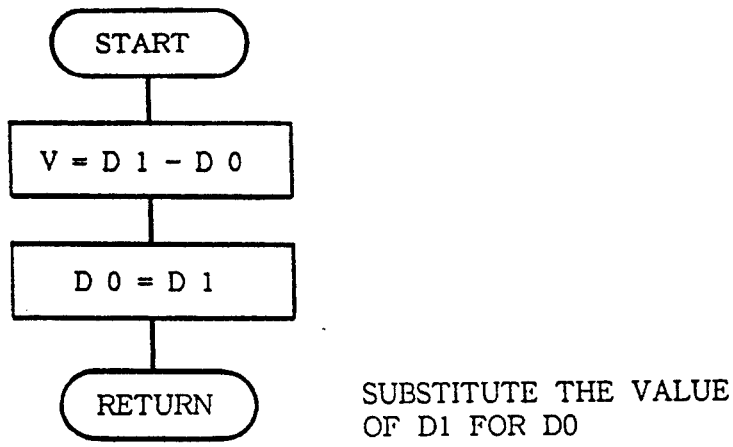
FIG. 5 is a diagram illustrating a subroutine for determining relative speed.

On the basis of these input signals, the control unit 15 calculates relative speed between the obstacle and the vehicle though a subroutine for determining relative speed. As shown in FIG. 5, relative speed V is calculated on the basis of the formula $V = D1 - D0$ by using a previously measured distance D0 from the vehicle to the obstacle and a presently (i.e., after the lapse of 10 msec) measured distance D1. In that case, since the measurement time interval is set to 10 msec, the calculation is very simple. In addition, by substituting the presently measured distance D1 for the previously measured distance D0, a new calculation of the relative speed is conducted.

Figure 6:
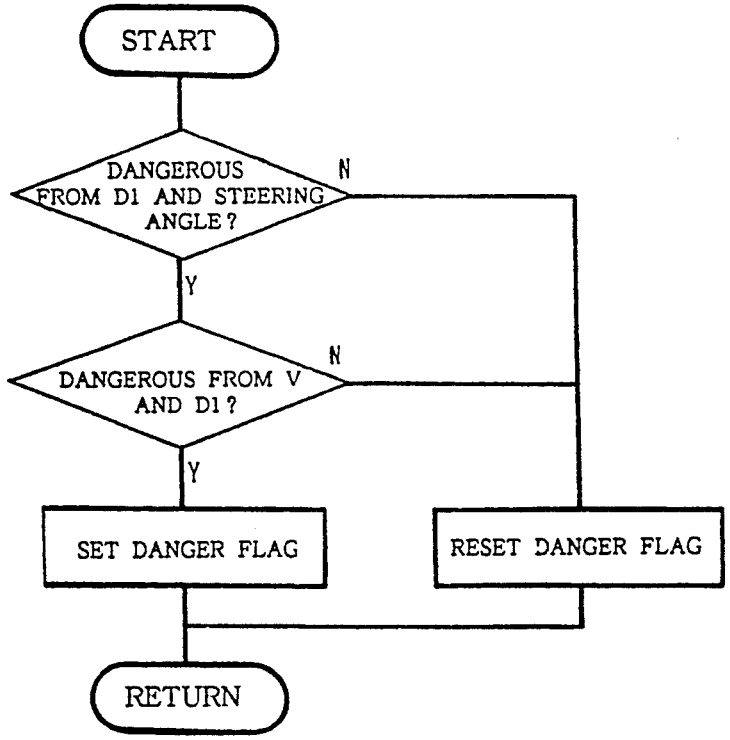
FIG. 6 is a diagram illustrating a subroutine for effecting danger determination processing.
Figure 7:
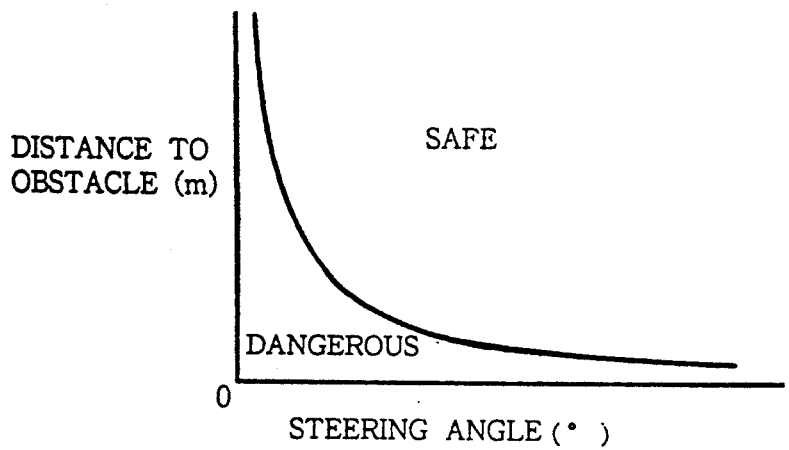
FIG. 7 is a diagram illustrating a map for setting a safe region and a dangerous region in the relationship between a steering angle and a distance to an obstacle.
Figure 8:
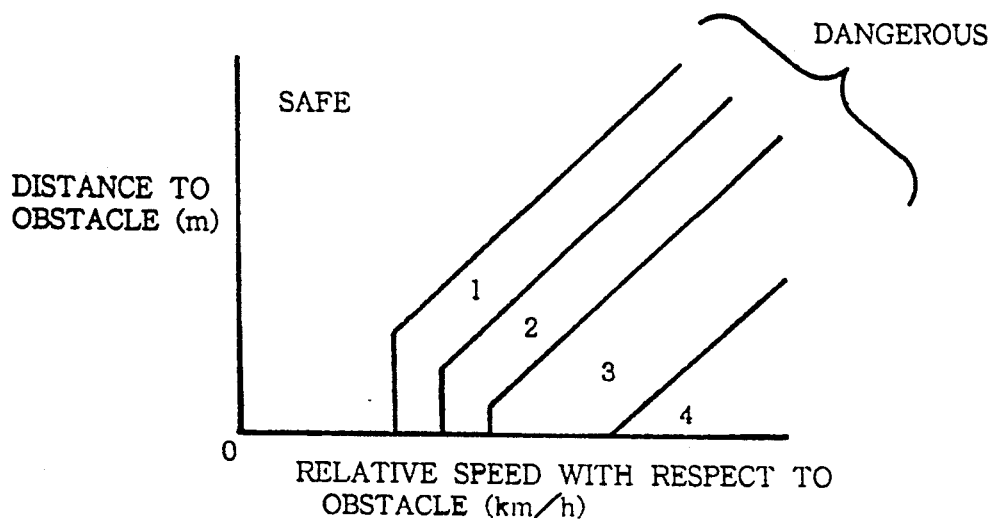
FIG. 8 is a diagram illustrating a map for setting a safe region and a dangerous region in the relationship between a relative speed with respect to an obstacle and a distance to the obstacle.
Figure 9A:
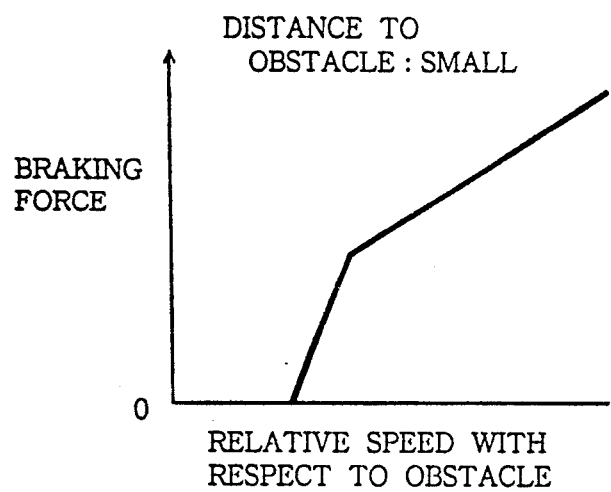
Figure 9B:
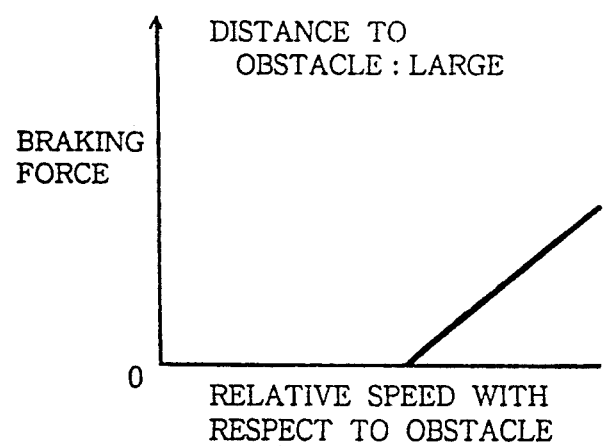

Then, on the basis of the relative speed thus calculated, danger determination processing is executed by using a subroutine for danger determination. As shown in FIG. 6, a determination is made on the basis of the presently determined distance D1 and the steering angle $\theta$ from the steering angle sensor 32 as to whether or not the vehicle will collide against the obstacle. In making this determination, in the light of the relationship between the steering angle and the distance to the obstacle, as shown in FIG. 7, a map is prepared in advance in which a region where the vehicle is capable of turning without colliding against the obstacle is set as a safe region, and a region where there is the danger of collision even if the vehicle turns is set as a dangerous region, the map being set in memory inside the control unit 15. Then, on the basis of the presently measured distance D1 and the steering angle $\theta$ from the steering angle sensor 32, the control unit 15 determines in which region of the map the vehicle is located. If the situation is determined to be dangerous, a determination is made on the basis of the relative speed V and the presently measured distance as to whether or not the vehicle will collide against the obstacle. In making this determination, in the light of the relationship between the relative speed V with respect to the obstacle and the distance D1 to the obstacle, as shown in FIG. 8, a map is prepared in advance in which a region where there is no danger of the vehicle colliding against the obstacle is set as a safe region, and a region where there is the danger of the vehicle colliding against the obstacle is set as a dangerous region, the map being set similarly in the memory inside the control unit 15. In that case, as for the situation in which the present a number of stages are set (four stages in this embodiment) depending on the degree of danger. That is, the setting provided is such that the dangerous stage 1 which is the closest to the safe region is the state of danger in which the degree of danger is the smallest, and the degree of danger becomes gradually greater as the number of the dangerous stage increases. In addition, on the basis of the presently measured distance D1 and the relative speed V, the control unit 15 determines in which region of the map the vehicle is located. If the situation is determined to be dangerous, on the basis of the measured distance D1 and the relative speed V, the control unit 15 determines a braking force corresponding to the present degree of danger of the vehicle, i.e., of such a magnitude that the vehicle will not collide against the obstacle. In that case, in determining the braking force, an optimum braking force is determined on the basis of maps that are prepared and stored in advance. As for these maps, in a case where the relative distance between the vehicle and the obstacle is relatively small, a map in which the relationship between the relative distance and the braking force becomes such as the one shown in FIG. 9A is prepared. Concurrently, in a case where the relative distance between the vehicle and the obstacle is relatively large, a map in which the relationship between the relative distance and the braking force becomes such as the one, shown in FIG. 9B is prepared. At the same time, a danger flag is set. In addition, if it is determined that the vehicle is safe both in the determination of the state of danger from the steering angle and the present measured distance, and in the determination of the state of danger from the relative speed and the present measured distance, the control unit 15 resets the danger flag.

Then, a determination is made as to whether the danger flag has been set or reset. If it is determined that the danger flag has been reset, the control unit 15 executes ordinary torque control for the motors. That is, by referring to a map prepared in advance, the control unit 15 determines a driving force or a braking force (i.e., torque of the motors) on the basis of the rotating direction of the motors from the forward/reverse command switch 33, the accelerator pedal position from the accelerator opening sensor 34, and the brake pedal position from the brake sensor 35. Then, the control unit 15 outputs a control signal to the motor drivers in such a manner that the torque of the driving motors becomes identical with the torque thus determined.

Meanwhile, if it is determined that the danger flag has been set, the control unit 15 outputs a brake signal to the motor drivers so as to apply to the motors the braking force determined in the danger determination processing. In each motor driver, a brake is applied to each motor as the switch of each transistor in its bridge circuit is controlled. As this brake, electric braking such as regenerative braking and dynamic braking is used. If regenerative braking, in particular, is used, it is possible to recover energy and, hence, attain an energy-saving effect.

Thus, the relative speed with respect to the obstacle located in front of the electric motor vehicle is reduced by decelerating the vehicle, so that the risk of a collision with the obstacle can be obviated. Then, detected signals from the respective sensors are inputted again to the control unit 15 after the lapse of each 10 msec, and the same processing and control as described above is repeated.

Thus, as the control flow shown in FIG. 4 is repeated, a collision with the obstacle located in front of the electric motor vehicle is obviated.

As described above, in accordance with the present invention, when an obstacle is present in front of the electric motor vehicle and the electric motor vehicle is likely to collide against the obstacle, brakes are automatically applied to the driving motors of the electric motor vehicle. Consequently, the collision of the electric motor vehicle against the obstacle is prevented positively, and the safety of the vehicle is improved.

We claim:

1. A collision-preventing apparatus for an electric motor vehicle in which at least one wheel is driven by an electric motor, said apparatus comprising:

an obstacle sensor for detecting the presence of an obstacle and for generating signals indicative of the distance between the vehicle and a detected obstacle;

a control unit including:
      a first map of speeds of the vehicle relative to the obstacle correlated with distances, said first map being divided into safe and unsafe areas;
      a second map of steering angles correlated with distances, said second map being divided into safe and unsafe areas;
      calculating means for calculating the speed of the vehicle relative to the detected obstacle on the basis of said signals received from said obstacle sensor;
      first determining mans for determining if the calculated relative speed and distance fall within said unsafe area of said first map;
      second determining means for determining if said sensed steering angle and distance fall within said unsafe area of said second map; and
      brake signal generating means for generating a brake actuation signal if within said unsafe area both of said first map and said second map; and
   braking means for braking said electric motor responsive to said brake actuation signal.

2. The collision-preventing apparatus of claim 1 wherein said control unit further includes:
   a third map of distances correlated with braking forces;
   third determining means for determining an appropriate braking force by comparing detected distance against said third map; and
   wherein said braking means applies the determined appropriate braking force to said electric motor responsive to said brake actuation signal.

3. The collision-preventing apparatus of claim 2 wherein said braking means is means for regenerative electrical braking.

4. The collision-preventing apparatus of claim 2 wherein said braking means is means for regenerative electrical braking.

5. The collision-preventing apparatus of claim 3 wherein the electric motor vehicle has four wheels and four electric motors, each electric motor driving one of said four wheels.

6. The collision-preventing apparatus of claim 4 wherein the electric motor vehicle has four wheels and four electric motors, each electric motor driving one of said four wheels.

7. The collision-preventing apparatus of claim 1, wherein said calculating means calculates relative speeds on the basis of said distances.

8. A collision-preventing apparatus for an electric motor vehicle in which at least one wheel is driven by an electric motor, said apparatus comprising:

an obstacle sensor for detecting the presence of an obstacle and for generating distance signals indicative of the distance between the vehicle and detected obstacle;

a steering angle sensor for sensing the steering angle of the vehicle;

a control unit including:
      a first map of steering angles correlated with distances divided into safe and unsafe areas;
      first determining means for determining said sensed steering angle and distance fall within said unsafe area of said first map;
      generating means for generating a brake actuation signal if said sensed steering angle and distance fall within said unsafe area of said first map; and
   braking means for braking said electric motor responsive to said brake actuation signal.

9. The collision-preventing apparatus of claim 8, wherein said control unit further includes:
   a second map of distances correlated with braking forces; and
   second determining means for determining an appropriate braking force by comparing the detected distance against said second map; and
   wherein said braking means applies the determined appropriate braking force to said electric motor responsive to said brake actuation signal.

10. The collision-preventing apparatus of claim 9 wherein said braking means is means for regenerative electrical braking.

11. The collision-preventing apparatus of claim 10 wherein the electric motor vehicle has four wheels and four electric motors, each electric motor driving one of said four wheels.

* * * * *

UNITED STATES PATENT AND TRADEMARK OFFICE
CERTIFICATE OF CORRECTION

PATENT NO. : 5,251,680
DATED : October 12, 1993
INVENTOR(S) : MINEZAWA et al

It is certified that error appears in the above-indentified patent and that said Letters Patent is hereby corrected as shown below:

Col. 1, line 10, after "which" insert a comma --,--.

Col. 3, line 34, delete "dismounted" insert --is mounted--;

line 58, delete "132" and insert --$13_2$--;

line 62, delete "142" and insert --$14_2$--.

Col. 4, line 9, delete "he" insert --The--;

line 11, delete "lines" insert --line--;

line 55, after "of" insert --an--.

Col. 5, line 67, after "present" insert --state of running of the vehicle is in the dangerous region,--.

Signed and Sealed this

Fifth Day of July, 1994

Attest:

Attesting Officer

BRUCE LEHMAN
Commissioner of Patents and Trademarks